United States Patent [19]

Arndt et al.

[11] 4,130,756

[45] Dec. 19, 1978

[54] ENCODING MECHANISM FOR HOLED BADGE READERS

[75] Inventors: Richard L. Arndt, Byron; Wilfred L. Meyerhofer, Jr., Oronoco; David M. Steinbauer, Rochester, all of Minn.

[73] Assignee: International Business Machines Corporation, Armonk, N.Y.

[21] Appl. No.: 735,858

[22] Filed: Oct. 27, 1976

[51] Int. Cl.$^2$ .................. G06K 7/016; G06K 13/04; G06K 7/10

[52] U.S. Cl. .................................. 235/474; 235/466; 235/479

[58] Field of Search .................. 235/61.11 E, 61.11 D, 235/61.7 R, 61.7 B, 92 V, 61.11 R, 12 R, 479; 250/566, 268; 340/149 A

[56] References Cited

U.S. PATENT DOCUMENTS

| | | | |
|---|---|---|---|
| 3,238,357 | 3/1966 | Minka | 235/61.11 E |
| 3,419,710 | 12/1968 | Mathews | 235/61.11 D |
| 3,480,762 | 11/1969 | Del Vecchio | 235/61.11 E |
| 3,496,342 | 2/1970 | Milford | 235/61.11 E |
| 3,553,435 | 1/1971 | Pike | 235/61.11 E |
| 3,793,508 | 2/1974 | Maggi | 235/92 V |
| 3,858,032 | 12/1974 | Scantlin | 235/61.11 E |
| 3,976,857 | 8/1976 | Hogberg | 235/61.11 E |

Primary Examiner—Robert M. Kilgore
Attorney, Agent, or Firm—Keith T. Bleuer

[57] ABSTRACT

A reader for badges having rows of data representative holes therethrough, the reader including a row of data reading photo-sensitive devices or the like for sensing light passing through a row of the badge holes, a stationary encoder bar having two rows of holes therethrough and a carriage movable with the badge as it is moved across the row of data reading devices for reading the holes in the badge and carrying a pair of control photo-sensitive devices for sensing light passing through the holes of the encoder bar. The holes in the two rows in the encoder bar are slightly staggered with respect to each other so as to provide main composite states in which the two control photo-sensitive devices are either both activated or inactivated and transition states in which just one of the two control photo-sensitive devices is activated, and means are provided responsive to the transition states for reading the data representative holes in the badge at the time of occurence of the transition states during movement of the badge and carriage.

3 Claims, 7 Drawing Figures

ENCODING MECHANISM FOR HOLED BADGE READERS

BACKGROUND OF THE INVENTION

The invention relates to badges having rows of data representative holes therethrough and readers for reading the data representative holes as the badge is moved into the reader.

A badge reader of this general type has been previously proposed by R. L. Arndt and C. E. Johnson in the IBM Technical Disclosure Bulletin publication of March 1976, Vol. 18, No. 10, pages 3400-3404. This badge reader includes a PTX/LED (photo-transistor, light emitting diode) array for reading the rows of data representative holes in a holed badge moved into the reader. It also includes a carriage moved by the badge against a carriage return spring as the badge is moved into the reader and carrying a photo-transistor movable over a series of holes provided in a stationary encoder bar. There are at least as many of the encoder bar holes as rows of data representative holes in the badge being read so that an emitter signal is generated by the photo-transistor carried by the carriage for each of the rows of data representative holes in the badge. No means is provided for indicating whether the carriage is traveling in either one direction or the other.

An emitter similar to that in the publication just described is also shown in a publication by P. R. Brinson and C. E. Johnson in the IBM Technical Disclosure Bulletin entry of June 1974, Vol. 17, No. 1, pages 190 and 191. The device shown in this publication also includes a row of light sensitive devices actuated by the holes in a badge, with a flexible emitter strip traveling with a carriage actuated by the badge for providing a single emitter pulse for each of the rows of data representative holes in the badge.

Such readers and emitters are just described function quite well if the operator is certain to insert the badge into the reader in one continuous forward motion. In these cases, a single emitter pulse is generated for each of the rows of badge holes so that these holes may be read on the existence of an emitter signal. In practice, however, there is a tendency for untrained operators to insert the badge part way into the reader and then regrasp the badge for final insertion. During the regrasp time, the return spring provided for the carriage of the reader forces the badge partially out of the reader so that more than one emitter pulse is provided for at least one of the rows of data representative holes in the badge, causing an error condition to arise. The combined motions, forwardly and reversely as just described, cannot be validly read by the previous hole badge readers, since there is no mechanism to report the combined forward and reverse motions to the controls for the badge reader.

SUMMARY OF THE INVENTION

It is an object of the present invention to provide an improved encoder or emitter for use in connection with such readers for holed badges which is so arranged as to indicate whether the badge is moving in one direction or the other as the badge passes across a row of light sensitive devices for reading the holes in the badge.

In this connection, it is an object of the invention to provide an improved encoder bar having two rows of holes therein usable in connection with two control photo-sensitive devices movable with a badge as it is moved in the reader across a row of data reading light sensitive devices cooperating with the rows of holes in the badge. More particularly, it is an object of the invention to stagger the holes in the two rows so that the two control photo-sensitive devices cooperating with the two rows of encoder holes indicate whether the badge is traveling in one direction or the other in the reader.

It is a still more particlar object of the invention to stagger corresponding holes in the two rows in the encoder bar just slightly, considerably less than the lengths of the holes, so as to provide four different composite states derived from the two control photo-sensitive devices as each of the photo-sensitive devices travels from the initial edge of one of the encoder bar holes in its row to the initial edge of the next of the holes in this row. Such states may include two main states in which both of the photo-sensitive devices are either actuated or inactuated and two transition states in which only one of the photosensitive devices is activated.

It is a further object of the invention to so arrange the parts of the reader that the data representative holes in the badge are aligned with a row of data reading photo-sensitive devices for reading these holes concomitantly with the existence of each of these transition states derived from the holes in the encoder bar and the two control phototransistors. In this connection, it is an object of the invention to provide circuitry for reading the data from the row of photo-sensitive devices activated by light passing through the holes of the badge when these transition states exist.

It is another object of the invention to provide counting means actuated by the two control photo devices cooperating with the two rows of encoder bar holes so as to indicate the actual position of the badge in the reader, counting up as the badge is moved forwardly in one direction in the reader and counting down as the badge temporarily moves backwardly in the reader so that a continued reading of the badge may be obtained simply by again moving the badge in the forward direction in the reader.

It is also an object of the invention to provide means for indicating read errors, particularly when a predetermined sequence of composite states is not derived, due to some misfunction, from the two control photo devices cooperating with the two rows of encoder bar holes and also when the data representative holes in the badge being read are, due to some mistake, not properly positioned with respect to the leading end of the badge that moves the carriage carrying the two control photo-sensitive devices cooperating with the two rows of holes in the encoder bar.

DESCRIPTION OF THE PREFERRED EMBODIMENT

Figure 1:
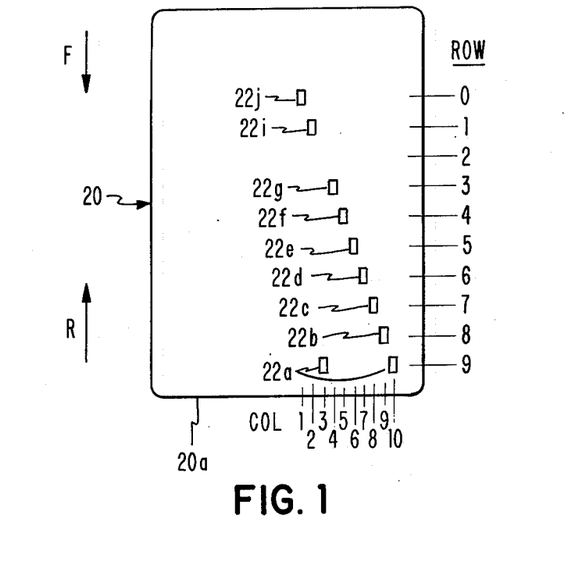
FIG. 1 is a plan view of a holed badge that may be used with the reader and its controls of the invention.
Figure 2:
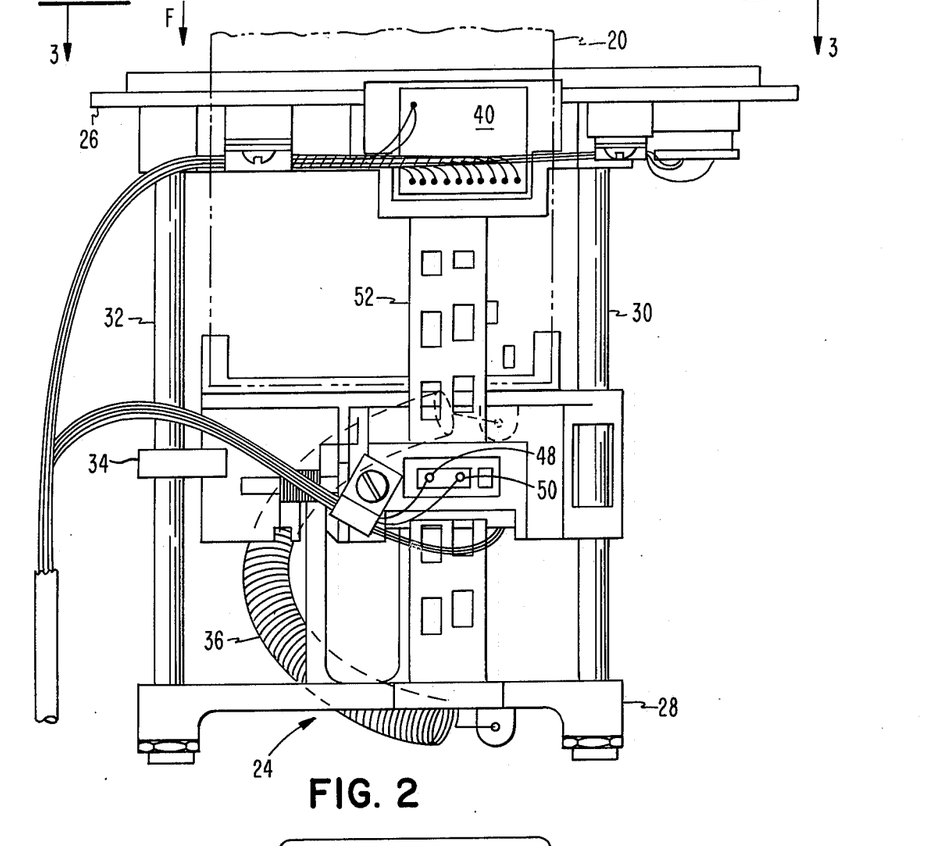
FIG. 2 is a plan view of a reader with which the badge of FIG. 1 may be used.

The badge 20 illustrated in FIG. 1 and particularly its holes or perforations 22a–22j are adapted to be read by the badge reader 24 illustrated in FIG. 2. The badge 20 is of relatively thin material, such as of about 0.035 inch (0.9mm) thickness, for example; and the holes 22a–22j are disposed in 10 transversely extending rows 0–9 and 10 longitudinally extending columns. There should preferably be only one hole 22 in any one of the columns. Holes 22a, 22b, 22c, 22d, 22e, 22f, 22g, 22h, 22i, and 22j are respectively disposed on transversely extending rows 9, 8, 7, 6, 5, 4, 3, 2, 1, and 0 which may be ¼ inch (6.35mm) apart, for example. There may be up to 10 of the holes 22 in each of these ten rows, and there are for instance two of the holes 22a shown in the ninth row which are respectively also in longitudinally extending columns 3 and 10. Each of the holes 22 may be, for example, ⅛ inch (3.17mm) in length and 1/16 inch (1.58mm) in width. Holes 22 in the same column and in adjacent rows would thus be spaced apart ⅛ inch (3.17mm) and would be spaced ¼ inch (6.35mm) on their centers. The badge 20 is inserted into the reader 24 in the direction F and is returned by the reader to the operator, moving in the opposite direction R.

Figure 3:
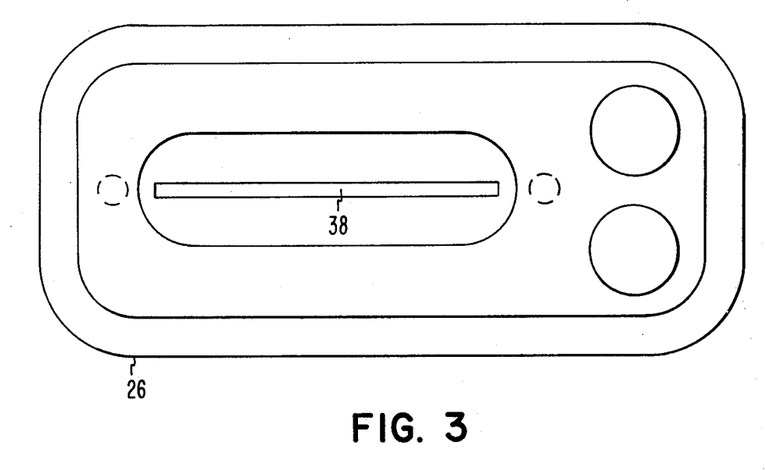
FIG. 3 is an end view of the reader taken from line 3—3 of FIG. 2 and showing the badge receiving slot of the reader.

The reader 24 (see FIG. 2) comprises a front panel 26, a rear frame 28, and two guide rods 30 and 32 that rigidly connect the frame 28 with the panel 26. A carriage 34 is slidably disposed on the rods 30 and 32, and a return spring 36 extends between the frame 28 and the carriage 34 for moving the carriage 34 toward and into contact with the panel 26. The panel 26 is provided with a slot 38 in it (see FIG. 3) through which the badge 20 may be inserted so as to make contact with the carriage 34 by means of the leading badge edge 20a. The badge 20 is inserted into the slot 38 in the direction F; and, on continued movement of the badge 20 in this direction, it moves carriage 34 in direction F against the action of the spring 36 away from the panel 26. The spring 36 is effective to move the carriage 34 and the badge 20 back in the opposite direction R when the operator ceases to exert force on the badge 20.

A data reading photo-transistor array 40 (see FIGS. 2 and 6) is carried by the panel 26 above the slot 38, and a light emitting diode array 42 is carried by the panel 26 below the slot 38. These include a row of 10 of the light emitting diodes and a row of 10 of the data reading photo-transistors respectively in alignment with each other and also in alignment with the 10 columns of holes 22 in the badge 20 as the badge 20 is moved through the slot 38 so that the openings 22 in the 10 columns are read by light transmitted through the openings from the light emitting diodes onto the photo-transistors. In lieu of 10 phototransistors, a fewer number of multi-plexed photo-transistors may be used; but, in this case also, there is a light receiving opening in line with each of the light emitting diodes and constituting photo-sensitive means.

Figures 6, 7:
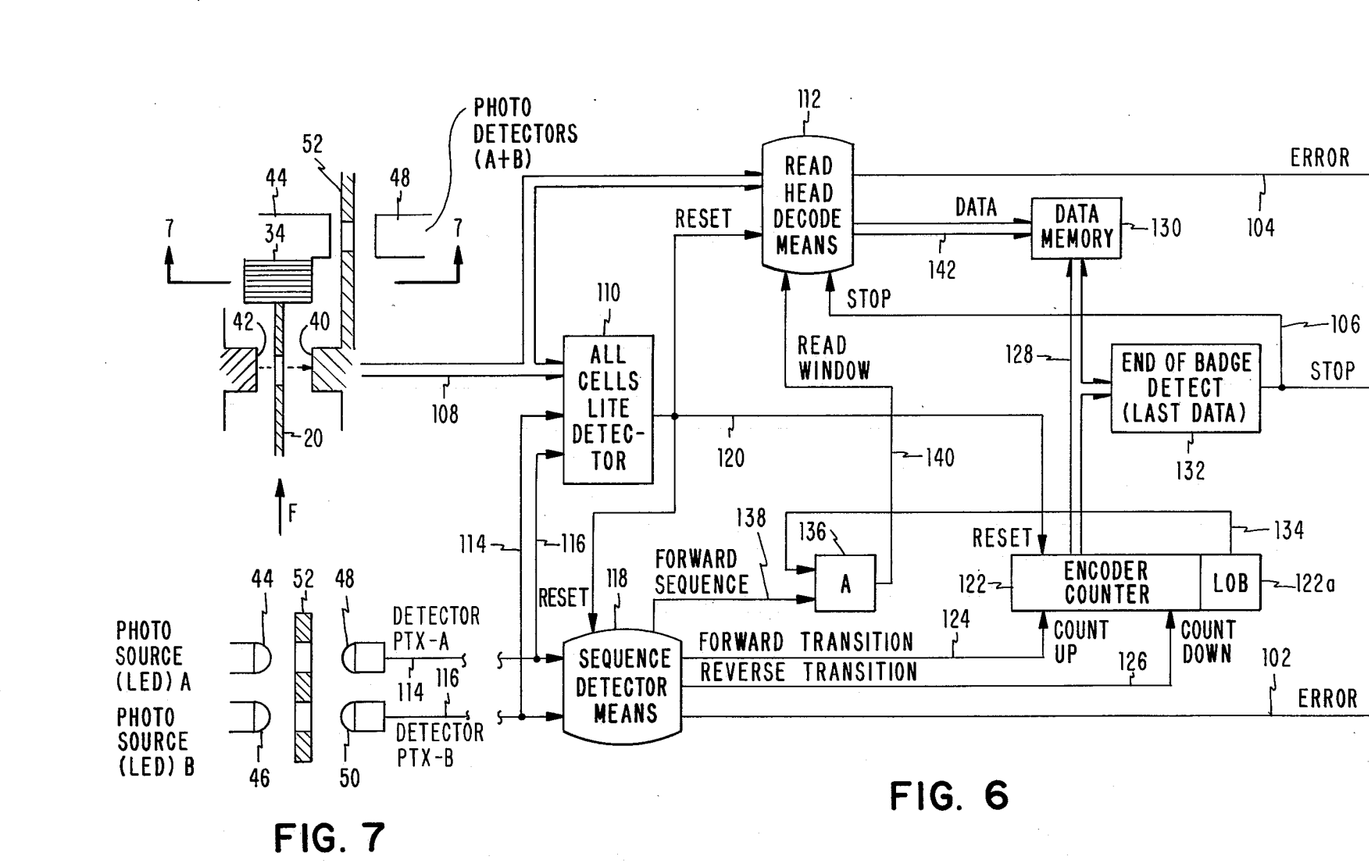
FIG. 6 is a diagram showing controls that may be used with the reader illustrated in FIG. 2.
FIG. 7 is a sectional view taken on line 7—7 of FIG. 6 and showing the encoder bar and a pair of control photo-transistors cooperating with the encoder bar.

The carriage 34 carries two light emitting diodes 44 and 46 and two control photo-transistors 48 and 50 (see FIGS. 2, 6 and 7). The control photo-transistor 48 is disposed opposite the light emitting diode 44, and the control photo-transistor 50 is disposed opposite the light emitting diode 46; and an encoder bar 52 is disposed between the light emitting diodes 44 and 46 and the photo-transistors 48 and 50 (see FIGS. 2, 4, 6, and 7). The encoder bar 52 is fixed with respect to the panel 26 by rivets or the like passing through openings 52a in the bar 52, and the other end of encoder bar 52 is disposed in a receiving slot in the frame 28 so that, in effect, the encoder bar 52 is fixed with respect to both the panel 26 and the frame 28.

The encoder bar 52 is provided with a row of six holes 54–59 (see FIG. 4) that are in alignment with the light emitting diode 44 and photo-transistor 48 as the carriage 34 moves along the guide rods 30 and 32 and is provided with a second row of six holes 64–69 that are in alignment with the light emitting diode 46 and photo-transistor 50 as the carriage 34 travels along the rods 30 and 32. The holes 54–59 are all ¼ inch (6.35mm) long, for example, and are formed by bar portions (such as portions 55a and 56a) between the holes which are of the same length of ¼ inch (6.35mm) as the holes. Likewise, the holes 64–69 are all spaced apart the same distance of ¼ inch (6.35mm) and each has the same length of ¼ inch (6.35mm). The holes 55–59 and 65–69 and the portions of the bar 52 between them thus have the same lengths as the spacing of the rows 0–9 in the badge 20 of ¼ inch (6.35mm). The hole 64 is shorter than the hole 54, and these holes respectively terminate on lines a and b which may be 1/16 inch (1.58mm) apart along bar 52. The holes 55 and 65 initiate on lines c and d which may also be 1/16 inch (1.58mm) apart. Likewise, the terminations and initiations of the holes 55–59 with respect to the holes 65–69 respectively are 1/16 inch (1.58mm) apart. For example, the line g shows the initiation of hole 66, and the line h shows the initiation of the hole 56 on bar 52, and the distance between these lines is 1/16 inch (1.58mm). The corresponding 1/16 inch (1.58mm) spacings of the other initiation and termination lines g–t are clear from FIG. 4 and indicate that corresponding holes in the two rows are staggered with respect to each other by this amount. Holes 57 and 67, for example, correspond to each other, since they are approximately opposite each other; and these holes are staggered 1/16 inch (1.58mm) with respect to each other.

Figure 4:
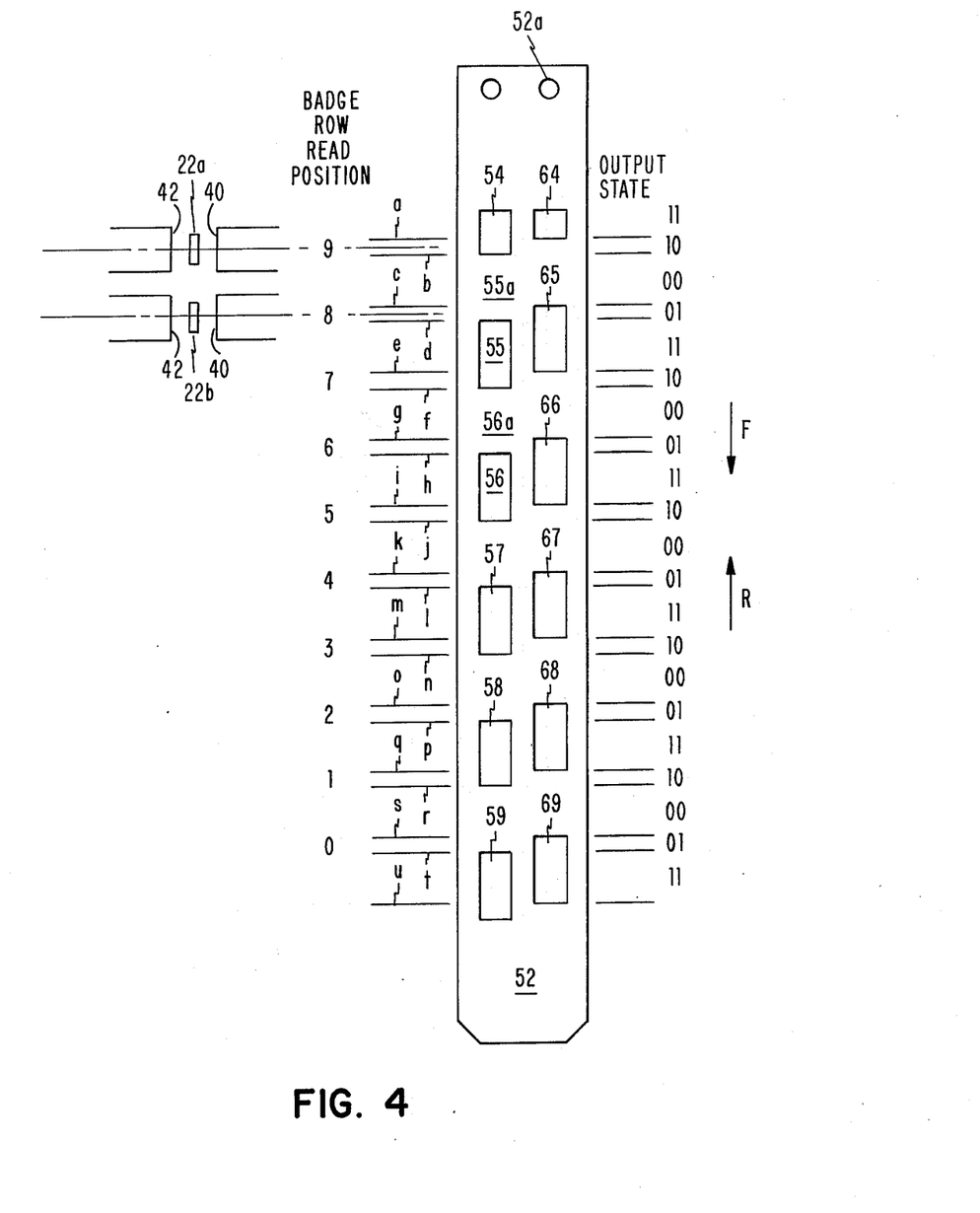
FIG. 4 is a plan view of an encoder bar included in the reader shown in FIG. 2.

The space between the lines a and b in FIG. 4 corresponds to a badge row read position 9, and the centers of the photo-transistors 48 and 50 are positioned midway between the lines a and b on bar 52 at the same time that the ninth row badge holes 22a are centered with respect to the photo-sensitive devices or photo-transistors in the read array 40, the badge 20 having been moved into the reader 24 to this extent. The space between the lines c and d corresponds to a badge row read position 8, and likewise the lines e–t define badge row read positions 7–0. The holes 54–59 and 64–69 define composite output states utilizing the LEDs 44 and 46 and the photo-transistors 48 and 50 as shown in FIG. 4. Whenever the photo-transistor 48 is energized from the light emitting diode 44, an output state of 1 is indicated; and likewise when the photo-transistor 50 is energized from the light emitting diode 46, an output state of 1 is indicated. Thus when both photo-transistors 48 and 50 are energized, the composite output state is 11 as shown on the extreme top right of FIG. 4. When the photo-transistor 50 is darkened as the photo-transistor 50 moves out of alignment with the opening 64 with travel of the carriage 34 in the forward direction F, the composite state is 10 as indicated in FIG. 4. When both of the photo-transistors 48 and 50 are darkened in traveling in direction F over an imperforate part of the encoder bar 52, the composite state is 00 as shown in FIG. 4. Subsequently, when the photo-transistor 50 is lighted from the light emitting diode 46 due to the existence of the hole 65 but without light from the light emitting diode 44 impinging on the photo-transistor 48 (between lines c and d), the composite state is 01. As the light emitting diodes 44 and 46 and the photo-transistors 48 and 50 travel along with the carriage 54 along encoder bar 52 in direction F, the composite states continue to change in the same manner as just described, namely from 11 through 10, 00, and 01, back to 11, all as indicated in FIG. 4. The carriage 34 will travel back again in direction R under the actuation of the spring 36, and the output states change reversely as is apparent from FIG. 4. The end output composite state 11 is defined as being between the line t and the line u with the latter being coincident with the termination of opening 69. The states 00 and 11 may be termed "main" states, and the states 01 and 10 may be termed "transition" states and are considerably shorter than the main states along the bar 52.

Figure 5:
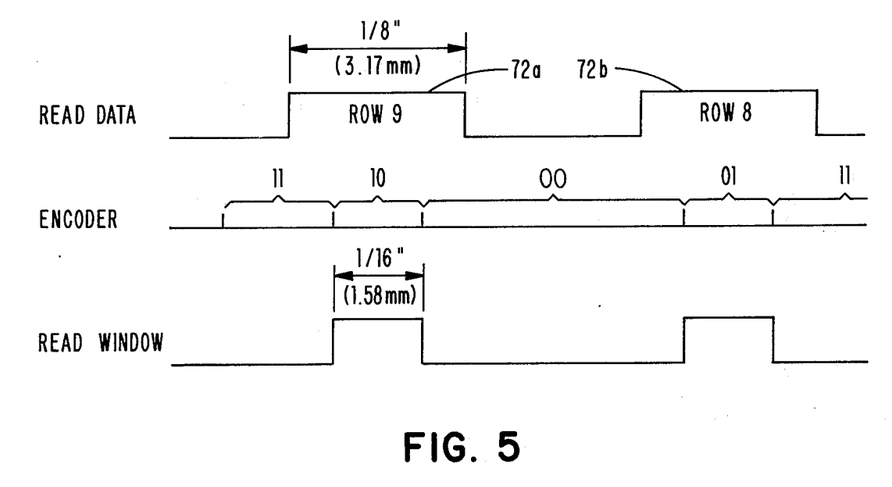
FIG. 5 is a diagram showing a Read Data output signal from a row of photo-transistors reading the data representative holes in the badge and also showing a Read Window signal and composite encoder states of 11, 10, 00, and 01 corresponding to the fluctuations of the Read Data signal.

FIG. 5 shows the Read Data curve 72 indicating the output of the photo-transistor array 40 when holes 22 are in alignment with the photo-sensitive devices of the array 40, and it will be observed from FIG. 5 that the state 10 is centered with respect to the raised output 72a of the Read Data curve 72 indicating that one or more of the row 9 badge openings 22a are being read by the array 40 at this time. Likewise, one or more of the openings 22b in the eighth row of the badge 20 are being read when the read data line 72 has a high at 72b, and the composite state of the photo-transistors 48 and 50 of 01 is centered with respect to the raised output 72b of the Read Data curve 72 in FIG. 5. The highs 72a and 72b are each ⅛ inch (3.17mm) in length corresponding to the ⅛ inch (3.17mm) length of the openings 22 in the badge 20, and the spacing between the highs 72a and 72b is also ⅛ inch (3.17mm) corresponding to this row spacing of badge 20. Likewise, the spacings and lengths of the other highs in the read data line are also ⅛ inch (3.17mm). The state 10 is defined by the lines a and b, and the state 01 is defined by the lines c and d as indicated in FIG. 4, and these states of 10 and 01 are all 1/16 inch (1.58mm) in length as previously mentioned. All of these distances are actually the distance of travel of the carriage 34 and the badge 20 as it is pushed into the reader 24 through the slot 38 and also as the reverse movement in the direction R takes place.

FIG. 6 shows a control for the reader 24 and provides error signals and a Stop signal (on output lines 102, 104, and 106) depending on the movement of the badge 20 in the reader 24. The photo-transistor array 40 is connected by means of a bus 108 with an All Cells Light Detector 110 and also with a Read Heat Decode Means 112. The phototransistor 48 is connected by means of a "PTX-A" line 114 (see FIG. 7 also) with the All Cells Light Detector 110, and the photo-transistor 50 is connected by means of a "PTX-B" line 116 with the All Cells Light Detector 110. The lines 114 and 116 are also applied to a Sequence Detector Means 118.

The output of the All Cells Light Detector 110 is a reset line 120, and this line is applied to the Read Head Decode Means 112 and the Sequence Detector Means 118 as well as to an Encoder Counter 122.

The Sequence Detector Means 118 causes the Encoder Counter 122 to count up by means of a signal applied through the Forward Transition line 124 and causes the Encoder Counter 122 to count down by means of a signal supplied through the Reverse Transition line 126. The Encoder Counter 122 has an output address bus 128 that is applied onto a Data Memory 130 and is also applied onto an End Of Badge Detect (Last Data) means 132 that has the Stop line 106 as an output. The Encoder Counter 122 has a low order bit LOB position 122a, and a line 134 connects the bit position 122a with an AND circuit 136 to provide an input thereto. Another input is supplied to the AND circuit 136 by means of a Forward Sequence line 138 from the Sequence Detector Means 118, and the AND circuit 136 has its output on a Read Window line 140 applied as an input to the Read Head Decode Means 112. The Read Head Decode Means 112 also has the Stop line 106 as an input and provides an output on the bus 142 to the Data Memory 130. The Read Head Decode Means 112 also has the error line 104 as an output, and the other error line 102 constitutes an output of the Sequence Detector Means 118.

In operation, for reading the perforations 22 in the badge 20, the badge 20 is inserted into the slot 38 in the forward direction F. The front edge 20a of the badge 20 moves against the carriage 34 and moves the carriage 34 in the direction F on continued insertion of the badge 20 into the reader 24. During this movement of the badge 20 and the carriage 34, the holes 22 in the card 20 are sensed by the photo-transistor array 40 energized by light from the light emitting diode array 42. There is a row of 10 of the light emitting diodes in the array 42 and a corresponding number of light receiving openings aligned with the light emitting diodes. There may be a photo-transistor for each of these openings or a less number of photo-transistors if multiplexing is used; at any rate, the array 40 includes the equivalent of 10 photo-responsive devices in a row, each of which senses the holes 22 in one of the 10 columns of the badge 20. The ninth row of holes 22a moves into registry with the photo-sensitive devices in the array 40 initially, and the 10 and third of these respectively sense the holes 22a in the 10 and third columns of the badge 20 as it is shown in FIG. 1. On continued movement of the badge 20 in the direction F into the reader 24, the hole 22b in the ninth column of badge 20 is sensed by the ninth of the photo-sensitive devices in the array 40. Likewise, whatever holes 22c, 22d, 22e, 22f, 22g, 22h, 22i, and 22j exist respectively in rows 7, 6, 5, 4, 3, 2, 1, and 0 of the badge 20 are sensed by the photo-transistor array 40 as the badge 20 is moved farther into the reader 24.

On this movement of the carriage 34 and badge 20 in direction F, the photo-transistor 48 which is fixed with respect to the carriage 34 is energized successively by light transmitted through the holes 54–59 and derived from the light emitting diode 44. Likewise, the photo-transistor 50 which also is fixed with respect to the carriage 34 is energized by light transmitted through the holes 64–69 from the light emitting diode 46 as the carriage 34 and badge 20 travel in direction F.

Referring to FIGS. 6 and 8, at the start of the read cycle (before the badge 20 is inserted into the reader and between the photo source array 42 and the photo detector array 40), the All Cells Light Detector 110 senses the output of the photo detector array 40 transmitted through the bus 108 and also senses the output of the two phototransistors 48 and 50 transmitted through the lines 114 and 116. At this time, the badge 20 does not block any of the light emitting diodes in the array 42 or the light emitting diodes 44 and 46, and therefore the corresponding phototransistors in the array 40 and the photo-transistors 48 and 50 are all illuminated by their corresponding light emitting diodes. At this time, with the carriage 34 being at the limit of its movement under the action of the spring 36 and in contact with the panel 26, the light emitting diode 44 and photo-transistor 48 are in register with the opening 54 in the encoder bar 52, and the light emitting diode 46 and the photo-transistor 50 are in register with the opening 64 in the encoder bar 52. The photo-transistors when all of them are so illuminated indicate a good read system with no badge 20 in the reader 24, and the All Cells Light Detector 110 being so energized by signals in the bus 108 and carried by lines 114 and 116 provides a reset signal on the line 120 an applied to the Read Head Decode Means 112, the Encoder Counter 122 and the Sequence Detector Means 118. The Read Head Decode Means 112, the Encoder Counter 122 and the Sequence Detector Means 118 are thus at this time reset and put into initialized conditions.

As the badge 20 is inserted into the reader 24, it moves the carriage 34 in the direction F and thus moves the photo-transistors 48 and 50 along the encoder bar 52 in this direction while the holes 22 in rows 9-0 of the badge 20 are read by the photo detector array 40, as has been described. The photo-transistors 48 and 50 thus supply the composite output states as shown in FIG. 4 by means of the two lines 114 and 116 on the Sequence Detector Means 118. The Sequence Detector Means 118 is so constructed as to apply a pulse signal on the Forward Transition line 124 at each change from one of the successive staes 11, 10, 00, 01, 11, etc. to the next of these states, such as at the change from 11 to 10, the change from 10 to 00, etc; and each of these pulse signals on the line 124 applies a "count up" signal on the Encoder Counter 122 as is indicated in FIG. 6. On the other hand, when the carriage 34 moves reversely in the direction R and the sequence of output states is 11, 01, 00, 10, 11, 01, 00, etc., the Sequence Detector Means 118 will provide a succession of Reverse Transition pulse signals on the line 126 at changes from successive composite states. Each of these Reverse Transition pulse signals on the line 126 provides a "count down" change in the Encoder Counter 122 as indicated in FIG. 6. Also, if during a forward movement in the direction F, the badge 20 is allowed to reverse its movement momentarily to momentarily move in the direction R, a Reverse Transition pulse signal will be provided by the Sequence Detector means 118 on the line 126 causing a "count down" operation of the Encoder Counter 122 after a succession of count up operations. This would occur, for example, if the badge is moved in the direction F so that the opening 67 is in alignment with the photo-transistor 50 but the hole 57 is out of alignment with the photo-transistor 48, producing a composite output state of 01 and then if the badge moves reversely slightly so that the composite state of 00 occurs. The state of 00 following the state of 01 indicates that the badge 20 has momentarily reversed its direction of movement, and the change from the 01 state to the 00 state causes the Sequence Detector Means 118 to apply a Reverse Transition pulse signal on the line 126 instead of a Forward Transition signal on the line 124 causing the Encoder Counter to count down for one count corresponding to the reversal of movement of the badge 20.

The carriage 34 and the encoder bar 52 are so constructed that, when the badge 20 is moving forwardly in the direction F and a badge data hole 22 is centered between the light emitting diode array 42 and the photo transistor array 40, the low order bit of the Encoder Counter is a "one". As indicated in FIG. 4, this may occur when the badge holes 22a are centered with respect to the space between the lines a and b and with respect to the transition state 10. Likewise, this may occur when the opening 22b is centered with respect to the lines c and d and the transition state 01 as indicated in FIG. 4. Likewise, this may occur when the badge openings 22c-22j are respectively centered with respect to the subsequent transition states of 10, 01, 10, 01, 10, 01, 10, and 01 and the line pairs of ef, gh, ij, kl, mn, op, qr, and st. It will be understood that the arrays 40 and 42 are shown in a number of positions in FIG. 4 only for the purpose of illustrating this action and that actually there is only one of the arrays 40 and one of the arrays 42.

The low order bit of counter 132 is applied to AND gate 136 through line 134 so that at this time AND gate 136 detects a "read window" time and applies the Read Window signal by means of the line 140 to the Read Head Decode Means 112. FIG. 5 shows the relationship of the Read Window signal on line 140, the Read Data signal on bus 108 produced by light passing through badge holes 22 on to transistor array 40 and the composite transition states of 10 and 01. This figure shows in particular that the raised pulses in the Read Data and Read Window signals are centered with respect to each other and that the Read Window pulses are co-terminous with the transition states of 10 and 01. The Read Window pulses can only occur when the badge 20 and carriage 34 are moving in the forward direction F at which time the Forward Sequence signal is applied from the Sequence Detector Means 118 onto the AND gate 136. At this time, all badge holes in a row of the badge 20, such as the two holes 22a, are allowing light to be applied onto the corresponding photo-transistors in the array 40; and the resultant signals on bus 108 indicated by high portion 72a of curve 72, for example, are applied to the Read Head Decode Means 112. The Read Head Decode Means under the action of the Read Window signal on line 140 allows this data on bus 108 to be transmitted through bus 142 to the Data Memory 130 and to be placed into the memory 130. The position in the Data Memory 130 at which this data is placed is at the location specified by the high order bits of the Encoder Counter 122 and applied to the bus 128 onto the Data Memory 130. On additional forward movement of the badge 20 in the direction F into the reader 24, the hole 22b in row 8 of the badge is aligned with the arrays 42 and 40 so that the resultant data represented by the energizing of the corresponding photo-transistor of array 40 is applied through the bus 108 to the Read Head Decode Means 112. The low order bit in Encoder Counter 122 is a "one" at this time with the composite output state of the photo-transistors 48 and 50 being a 01, and the Read Head Decode Means is energized by the Read Window signal on line 140 to transmit this data through bus 142 to Data Memory 130. The position in memory 130 in which this data is placed is determined by a new address supplied by bus 128 from the Encoder Counter 122. Subsequently the data represented by the badge holes 22c-22j in rows 7-0 are placed in successive positions in memory 130 in the same manner as the badge 20 moves forwardly in the direction F to register the successive openings 22c-22j with the arrays 40 and 42.

The End of Badge Detect means 132 is also subject to the high order bits of the Encoder Counter 122 as transmitted by data bus 128. The Encoder Counter 122 is caused to count up on the occurrence of successive composite states derived from the encoder bar 52 as previously described, and when the data from row 0 of badge holes 22 is supplied to the Data Memory 130, the End of Badge Detect means 132 applies a Stop signal on line 106. This indicates that all of the 10 rows of data representative holes 22a-22j in the badge 20 have been read by the photo-transistor array 40 and that the resulting data has been placed in the Data Memory 130. The Stop signal on line 106 applied to the Read Head Decode Means 112 assures that no data of any kind, such as could possibly be derived from the photo-transistor array 40 on a reverse movement of the badge 20 in the direction R, can be applied to the Data Memory 130. The Stop signal on line 106 can also be used as a signal to the operator that the badge 20 has been properly read.

During the reading operation, either the Read Head Decode Means 112 or the Sequence Detector Means 118 may signal the operator that an error has occurred by applying error signals on either line 104 or on line 102. Either of these signals may be used to signal the operator that the error has occurred and/or to stop reading using suitable circuit means until the operator removes the badge 20 from the reader 24 thereby again energizing the All Cells Light Detector 110 by having all of the photo-transistors in the array 40 and photo-transistors 48 and 50 illuminated as previously described. The All Cells Light Detector 110 resets the circuitry as has been previously described when providing the reset signal on the line 120.

The Sequence Detector Means 118 provides an error signal on the line 102 requiring a reread of the badge 20, if the sequence of signals on the lines 114 and 116 from the photo-transistors 48 and 50 does not follow either the forward or reverse sequence. As previously mentioned, the forward sequence of composite states referring to FIG. 4, is 00, 01, 11, 10 and 00. The reverse sequence is 00, 10, 11, 01, and 00. If neither of these sequences is followed, if for example the photo-detectors 48 and 50 due to some misfunction produce a 11 composite signal immediately following a 00 composite signal, the Sequence Detector Means 118 provides an error signal on the line 102.

The Read Head Decode Means 112 provides an error signal on the line 104 if the data on the bus 108 applied to the Read Head Decode Means 112 changes during the existence of the Read Window signal on line 140. This could occur if the data representative openings 22a-22j are punched out of proper position with respect to the front edge 20a of the badge 20. As is apparent, the front edge 20a of the badge 20 impinges on the carriage 34 and thus determines when the composite state signals shown in FIG. 4 are produced by the photo-transistors 48 and 50. The signals from these photo-transistors would be improperly produced timewise with respect to signals from the read array 40 if the holes 22a-22j are improperly placed with respect to the front edge 20a of the badge 20, thus necessitating the error signal on line 104.

As previously mentioned, an untrained operator for a reader of the type disclosed may insert the badge 20 part way into the reader 24 and may then regrasp the badge for final insertion. During this time, the spring 36 will force the badge 20 partially out of the reader so that there is a reversal of motion of the badge from the forward direction F to the reverse direction R. The Encoder Counter 122 takes care of this improper operation in counting down on the reverse motion of the badge and then again counting up when the badge again moves in the forward direction F so that the position of the badge is always in accord with the content of the encoder counter 122. A proper reading of the badge thus occurs.

Advantageously, the encoder bar 52 functioning in conjunction with the two control photo-transistors 48 and 50 is so constructed that it is used to indicate whether the badge 20 and the carriage 34 are moving in the forward direction F or in the reverse direction R. This is by virtue of the fact that the holes 55-59 are respectively out of line or staggered with respect to the holes 65-69 and the terminating ends of the initial openings 54 and 64 on lines a and b are also out of line. The holes 54-59 and the holes 64-69 thus produce the main states 00 and 11 in which none or both of these respective holes transmits light and transition states 10 and 01 when only one of the respective holes transmits light. Using the information from these staggered holes in the encoder bar 52, the Encoder Counter 122 is enabled to keep track of the position of the badge 20 in the reader 24 even with reversals of motion of the badge 20 so that correct reading of the holes 22 in the badge is accomplished. When the carriage 34 is in a position in which the transition states 01 and 10 occur, all of the holes 22 in the badge 20 in one of the 10 rows are aligned on their centers with the light emitting diode array 42 and the photo-transistor array 40, and reading thus occurs at this time. Such an encoder as the encoder 52 has also advantageously been found to be relatively insensitive to single bit errors as may be caused by electronic noise.

Because of the above-described error detection and correction properties of the encoder bar 52 used in conjunction with the two photo-transistors 48 and 50, the previously used technique of sampling a read emitter twice for data integrity is not required. As a result, the rate of reading may be doubled using the badge reader 24 in comparison with prior such readers previously mentioned.

As is apparent from FIG. 4 in particular, the main output states of the photo-transistors 48 and 50, which are the states 00 and 11 in which both of the photo-transistors 48 and 50 are either inactive or active, are far longer than the transition states 01 and 10 in which only one of the two photo-transistors 48 and 50 is active, these lengths being measured lengthwise of the encoder bar 52. This property puts the encoder of the invention (bar 52 and photo-transistors 48 and 50) in the class of non-uniform encoders and has the following two advantages for holed badge readers:

(1) Since a read window (when either the 01 or the 10 transition state exists with the Read Window signal up as shown in FIG. 5) must be defined by one encoder state, a uniform encoder (an encoder in which all of the lines a-u in FIG. 4 are equally spaced) would require four states per row of badge holes to be read which would complicate the decode as compared to the two required states (such as the states 10 and the adjacent state 00) per row of the non-uniform encoder of this invention.

(2) Defining the run length of an encoder as the distance the encoder must move (the distance of movement of the control photo-transistors 48 and 50) to have its output sequence through all possible values (such as from the main state 11 through the states 10, 00 and 01 back to the main state 11), the non-uniform encoder of this invention yields twice the overrun speed (the speed at which any given detector, such as the detector 118, cannot detect an erroneous state transition, such as for example, from the state 11 directly to the state 00) of an equivalent uniform encoder. This is true, since the undetectable overrun speed of an encoder is proportional to the run length of the code (states 11, 10, 00 and 01, for example) it generates.

It will be apparent that the lengths and spacings of the full sized holes 55–59 and 65–69 in the encoder bar 52 are related to the badge inter-row spacings (the spacings between the holes 22 of adjacent rows on their centers), and in fact the lengths and spacings of these holes in the encoder bar are the same as the inter-row badge spaces. This is true, since the initial and terminating ends of the encoder bar holes are those ends that are used to produce the transition states 01 and 10 that cause reading of the badge holes 22 to take place. The initial holes 54 and 64 are abbreviated in length, since it is only one end of each of these holes that is used to produce the transition state between the lines a and b in FIG. 4. Corresponding holes in the two rows in the encoder bar 52 are disclosed as being staggered at the distance of 1/16 inch (1.58mm) (the distance between lines s and t, for example) which is relatively small compared to the hole lengths of ¼ inch (6.35mm). Thus, the ratio of the stagger distance with respect to the encoder hole length is 1 to 4. This ratio can be increased to 1:2, for example, if desired, so that the stagger distance would be ⅛ inch (3.17mm) in lieu of 1/16 inch (1.55mm). So changing this ratio from 1:4 to 1:2 would have the advantage of allowing increased speed of the badge in the reader 24 while still obtaining a reading. There are advantages also, however, for maintaining the stagger distance small so as to tolerate spacing errors of the holes 22 in the badge 20. The stagger distance corresponds to the read window as shown in FIG. 5 which, if the badge holes are accurately located, is precisely in the center of each of the high portions (such as part 72a) of the Read Data signal 72. It is apparent that more shifting of the read window may take place with respect to each of the high portions of the Read Data curve 72 if the read window is made smaller, since the read window may still be aligned with the high portions of the Read Data curve. In this connection, the ratio of the stagger distance to the encoder hole length may be as low as 1:100, corresponding to a stagger distance in the particular example given of 0.010 inch (0.254mm); however, the stagger distance must be great enough so that the circuitry with which the reader 24 is used is capable of recognizing the relatively small transition state 01 or 10 as the badge 20 moves in the reader 24. The ratio of the stagger distance to the encoder hole length of 1:4 provided by the stagger distances of 1/16 inch (1.58mm) previously mentioned is considered a good compromise, providing for relatively high speeds of the badge 20 in the reader 24 and yet providing for acceptable tolerances of spacings of the badge holes 22. It will be noted from FIG. 5 in particular that this ratio of 1:4 provides for a read window of just ½ the length of a data window (the high portions 72a and 72b of the Read Data curve of FIG. 5 corresponding to the length of a badge hole 22).

Although the invention has been described in connection with a badge 20 having certain dimensions, such as data representative holes 22 of ⅛ inch (3.17mm) length and spacings and in connection with the encoder bar 52 having holes 54–59 and 64–69 of ¼ inch (6.35mm) length and spacings and with a staggering of corresponding holes in the two rows of 1/16 inch (1.58mm) (such as between the lines s and t), it will be apparent that badges and corresponding encoder bars of other dimensions may well be used within the purview of the invention. Although the reader controls of FIG. 6 are shown in the form of entities of logic, it will be apparent that all of the operations provided by the FIG. 6 controls can be provided by a microcontroller and that these entities of logic may actually represent corresponding programs in the microcontroller. In particular, the Read Head Decode Means 112, the All Cells Light Detector 110, the End Of Badge Detect means 132, the AND circuit 136, the Sequence Detector Means 118, and the Encoder Counter 122 may constitute a single microcontroller appropriately programmed to provide the described functions.

We claim:

1. A reader for reading data representative sensor actuating elements of a badge which are disposed in equally spaced rows extending across the badge, said reader comprising:
   a row of data reading sensors actuated by the sensor actuating elements of the badge as it passes across the sensors in moving in a certain direction,
   a carriage movable with the badge as it passes across said sensors,
   encoding mechanism actuated by said carriage and including a stationary encoder bar and a pair of control sensors carried by said carriage, said encoder bar including two parallel rows of sensor actuating bar portions defined by holes in said bar, said control sensors being respectively in registry with said two rows of bar portions as said carriage moves along with the badge as the badge passes across said sensors and being in a row extending at right angles to said direction, said bar portions having the same lengths and spacings in said two rows and having spacings on their centers double the spacings on centers of said rows of sensor actuating elements of the badge and being staggered for a distance of less than one-half of the lengths and spacings of said bar portions in either of said rows, and
   means connected with said control sensors and effective when either of said control sensors is active and the other is inactive for gating data from said data reading sensors at that time.

2. A reader as set forth in claim 1, said distance of staggering of said bar portions in the two rows of bar portions being about one-fourth of the spacings and lengths of said holes.

3. A reader as set forth in claim 1, said sensor actuating elements of said badge being provided by holes through the badge, and said data reading sensors constituting photosensitive elements.

* * * * *